(12) United States Patent
Kim et al.

(10) Patent No.: US 11,571,842 B2
(45) Date of Patent: Feb. 7, 2023

(54) MANUFACTURING METHOD OF SPRING PAD FOR AUTOMOBILE SUSPENSION SYSTEM USING FOAM INJECTION MOLDING

(71) Applicant: DMC, INC, Seongnam-si (KR)

(72) Inventors: Sung Sool Kim, Hwaseong-si (KR); Dong Ui Kim, Cheongju-si (KR); Hyung Joon Kim, Seoul (KR); Hyung Jin Kim, Yeongcheon-si (KR); Byeong Gu Jang, Yeongcheon-si (KR); Jun Shin, Daegu (KR); Won Wook Lee, Yeongcheon-si (KR)

(73) Assignee: DMC, INC, Seongnam-si (KR)

( * ) Notice: Subject to any disclaimer, the term of this patent is extended or adjusted under 35 U.S.C. 154(b) by 245 days.

(21) Appl. No.: 16/836,957

(22) Filed: Apr. 1, 2020

(65) Prior Publication Data
US 2021/0268698 A1    Sep. 2, 2021

(30) Foreign Application Priority Data
Feb. 27, 2020    (KR) .......................... 10-2020-0024612

(51) Int. Cl.
*B29C 44/08*    (2006.01)
*B29C 44/34*    (2006.01)
(Continued)

(52) U.S. Cl.
CPC .......... *B29C 44/08* (2013.01); *B29C 44/3442* (2013.01); *B60G 13/18* (2013.01);
(Continued)

(58) Field of Classification Search
CPC ................ B60G 13/18; B60G 2204/41; B60G 2206/81012; B60G 15/063;
(Continued)

(56) References Cited

U.S. PATENT DOCUMENTS

| 6,250,903 B1* | 6/2001 | Fernandez .......... B29C 45/1735 264/572 |
| 2011/0217538 A1* | 9/2011 | Miura .................... C08L 53/02 524/505 |
| 2016/0221282 A1* | 8/2016 | Maikisch .......... B29C 45/14426 |

FOREIGN PATENT DOCUMENTS

| JP | 2010-014132 A | 1/2010 |
| JP | 2010014132 A * | 1/2010 |

(Continued)

OTHER PUBLICATIONS

KR20190013398A English Translation and original document retrived from Espacenet on Jul. 13, 2022 (Year: 2019).*

(Continued)

*Primary Examiner* — Paul N Dickson
*Assistant Examiner* — Caitlin Anne Miller
(74) *Attorney, Agent, or Firm* — Revolution IP, PLLC

(57) ABSTRACT

Disclosed herein is a manufacturing method of a spring pad interposed among a spring used in an automobile suspension system and an upper sheet and a lower sheet for supporting the spring, wherein the spring pad includes an insulator getting in contact with the spring to absorb shock and forming a body of the spring pad, and is manufactured through foam injection molding of the insulator to be lightweight.

4 Claims, 7 Drawing Sheets

(51) Int. Cl.
*B60G 13/18* (2006.01)
*F16F 1/37* (2006.01)
*B29K 101/12* (2006.01)
*B29L 31/30* (2006.01)

(52) U.S. Cl.
CPC .......... *F16F 1/37* (2013.01); *B29K 2101/12* (2013.01); *B29L 2031/30* (2013.01); *B60G 2204/41* (2013.01); *B60G 2206/73* (2013.01); *B60G 2206/81012* (2013.01); *F16F 2224/0225* (2013.01); *F16F 2226/00* (2013.01)

(58) Field of Classification Search
CPC .... B29K 2101/12; F16F 2226/00; F16F 1/12; B29C 45/14; B29C 45/00; B29C 45/17; B29C 45/72; B29C 44/02; B29L 31/00
USPC ........................................................ 264/45.1
See application file for complete search history.

(56) References Cited

FOREIGN PATENT DOCUMENTS

| | | | | |
|---|---|---|---|---|
| KR | 10-2002-0038378 | A | | 5/2002 |
| KR | 20020038378 | A | * | 5/2002 |
| KR | 20130017151 | A | * | 2/2013 |
| KR | 10-1459277 | B1 | | 11/2014 |
| KR | 10-1490736 | B1 | | 2/2015 |
| KR | 20170025879 | A | * | 8/2015 |
| KR | 20170056427 | A | * | 10/2016 |
| KR | 10-1911322 | B1 | | 5/2017 |
| KR | 10-1882334 | B1 | | 7/2018 |
| KR | 10-1887390 | B1 | | 8/2018 |
| KR | 20190013398 | A | * | 2/2019 |
| KR | 10-1937696 | B1 | | 4/2019 |
| KR | 101937696 | B1 | * | 4/2019 |

OTHER PUBLICATIONS

Office Action of Korea Patent Application No. 10-2020-0024612 dated Dec. 29, 2020.

* cited by examiner

MANUFACTURING METHOD OF SPRING PAD FOR AUTOMOBILE SUSPENSION SYSTEM USING FOAM INJECTION MOLDING

BACKGROUND OF THE INVENTION

Field of the Invention

The present invention relates to a manufacturing method of a spring pad for an automobile suspension system using foam injection molding, and more particularly, to a manufacturing method of a spring pad for an automobile suspension system using foam injection molding to achieve weight lightening.

Background Art

In general, an automobile suspension system connects an axle to a vehicle body in order to relieve vibration or shock from the road surface and transmit the relieved shock or vibration to the vehicle body during running, thereby enhancing comfortability and preventing damages of the vehicle body and goods.

The automobile suspension system includes a shock absorber, a lower pad and an upper pad mounted on a cylinder of the shock absorber to be spaced apart from each other, a coil spring mounted between the lower pad and the upper pad, and spring pads respectively mounted between the coil spring and the lower pad and between the coil spring and the upper pad.

Here, the pads prevent a direct contact between the coil spring and a lower sheet and a direct contact between the coil spring and an upper sheet in order to absorb shock and prevent damages of the coil spring and the sheets.

The spring pad is generally made of a single material, but is made with a composite material into which a steel material is inserted into the spring pad in order to counteract the power transferred by vibration and shock if a transferred load is heavy.

Referring to FIG. 1, when the pads are manufactured, a frame made of a rigid material is first injection-molded.

After that, an adhesive is coated on the frame, and then, the frame is inserted into an injector.

Moreover, an insulator is second injection-molded in the state where the frame is inserted into the injector.

In this instance, the insulator is generally molded using rubber, which is an elastic body.

The adhesion process in the conventional spring pad manufacturing method is inconvenient in that a spread volume and a spread area of the adhesive must be inspected and in that it takes much work time.

Furthermore, products on which the adhesive is spread have a relatively short storage period (within seven days), take long working time and deteriorate productivity since requiring lots of processes due to various follow-up measures, such as verification of adhesion strength through an adhesion test under various conditions, for instance, anti-aging salt water.

Additionally, the products are heavy since the steel material is inserted into the rubber, become a main cause of environmental pollution since being impossible to be recycled or reclaimed, and incur enormous expenses for disposal of waste matters.

PATENT LITERATURE

Patent Documents

Patent Document 1: Korean Patent No. 10-1459277
Patent Document 2: Korean Patent No. 10-1490736
Patent Document 3: Korean Patent No. 10-1911322
Patent Document 4: Korean Patent No. 10-1887390
Patent Document 5: Korean Patent No. 10-1882334

SUMMARY OF THE INVENTION

Accordingly, the present invention has been made to solve the above-mentioned problems occurring in the prior arts, and it is an object of the present invention to provide a manufacturing method of a spring pad for an automobile suspension system using foam injection molding, which simplifies a manufacturing process, makes products lightweight by reducing weight of the products and improves productivity by applying foamed plastic technique in comparison with the conventional spring pad comprising rubber and the steel material of a single material or composite material, and which utilizes foam injection molding of a thermoplastic material to be recyclable.

Technical objects to be achieved by the present invention are not limited to the above-described objects and other technical objects that have not been described will be evidently understood by those skilled in the art from the following description.

To accomplish the above object, according to the present invention, there is provided a manufacturing method of a spring pad interposed among a spring used in an automobile suspension system and an upper sheet and a lower sheet for supporting the spring, wherein the spring pad includes an insulator getting in contact with the spring to absorb shock and forming a body of the spring pad, and is manufactured through foam injection molding of the insulator to be lightweight.

Moreover, the spring pad includes a frame combined with the insulator to enhance rigidity of the insulator.

Furthermore, the spring pad manufacturing method includes the steps of: (S110) preparing a first molding device for injection-molding the insulator; and (S120) doing foam injection molding of the insulator through the first molding device.

Additionally, the spring pad manufacturing method includes the steps of: (S210) preparing a first molding device for injection-molding the insulator and a second molding device for injection-molding the frame; and (S220) doing foam injection molding of the insulator through the first molding device; and (S230) inserting the foam injection molded insulator into the second molding device in order to injection-mold the frame.

In addition, the insulator foam injection molding steps (S120, S220) include the steps of: (S121, S221) supplying and melting a material of the insulator to the cylinder of the first molding device; (S122, S222) supplying compressed blistering gas into the cylinder; (S123, S223) mixing the blistering gas with the melted insulator material; (S124, S224) supplying the insulator material, with which the blistering gas is mixed, into the mold of the first molding device; and (S125, S225) cooling and blowing out the foam injection molded insulator.

Moreover, the blistering gas supplying steps (S122, S222) include the step of: depressurizing the blistering gas at a predetermined supply pressure through a decompression device.

Furthermore, the supply pressure V(bar) of the blistering gas is set to satisfy the following [Mathematical formula 1]:

$N=V+(5\sim50)$ (bar), wherein $N$ is pressure (bar) of insulator material in the cylinder. [Mathematical Formula 1]

Additionally, the foam injection molding steps (S124 and S224) include the steps of: supplying the blistering gas mixed with the insulator material into the mold in the cylinder and dropping pressure; and forming foamed bubbles while dropping pressure to expand the blistering gas.

In addition, a foaming rate of the insulator is from 10% to 40%, and the blistering gas is nitrogen.

Moreover, the insulator and the frame are made of thermoplastic resin, and rigidity of the insulator material is lower than that of the frame material and a melting point of the insulator material is lower than that of the frame material. A spring pad in which the insulator and the frame are formed integrally is manufactured using a difference in melting point between the insulator material and the frame material.

Furthermore, the insulator insert frame injection molding step (S230) includes the steps of: (S231) inserting the insulator 110 into a mold of the second molding device; (S232) melting the frame material and injecting the melted frame material into the mold of the second molding device; (S233) melting the surface of the insulator by the frame material; (S234) mixing some of the melted surface of the insulator with the frame material on the boundary surface between the frame material and the insulator; (S235) joining the insulator and the frame integrally while cooling the frame material; (S236) blowing out the spring pad in which the insulator and the frame are formed integrally.

Additionally, the insulator material is thermoplastic polyester elastomer (TPEE), thermoplastic poly urethane (TPU), thermoplastic vulcanizates (TPV), or TPC.

Furthermore, the frame material is thermoplastic elastomer (TPE), nylon, PA6, PA66, poly butylene terephthalate (PBT), poly propylene (PP), acrylonitrile butadiene styrene (ABS), or poly carbonate (PC).

Additionally, combination of the insulator material and the frame material may be set as the following Case 1 or Case 2:

(Case 1): TPE+TPEE, TPE+PBT, PC, ABS or TPU; and
(Case 2): TPU+TPU, TPU+PA6, PA66, PC, ABS or TPE.

In addition, the frame material includes at least one among 10 to 60 parts by weight of glass fiber (GF) and 10 to 40 parts by weight of talc (crushed rock) based on 100 parts by weight of base chips made of PBT and PA6 (Polyamide) or PA66 (Polyamide).

The manufacturing method of a spring pad for an automobile suspension system using foam injection molding according to the present invention can substitute rubber and steel with a recyclable thermoplastic material, simplify the manufacturing process in comparison with the conventional spring pad manufacturing process and save production costs and energy by utilizing the plastic foaming method, enhance productivity due to reduction of molding time, and lighten weight of the spring pad, and is environment-friendly through recyclability.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 6A and 6B are schematically perspective views of a spring pad according to a preferred embodiment of the present invention, wherein FIG. 6A is a photograph showing a spring pad made with a single material and FIG. 6B is a photograph showing a spring made with a composite material.

DETAILED DESCRIPTION OF THE PREFERRED EMBODIMENT

Figure 1:
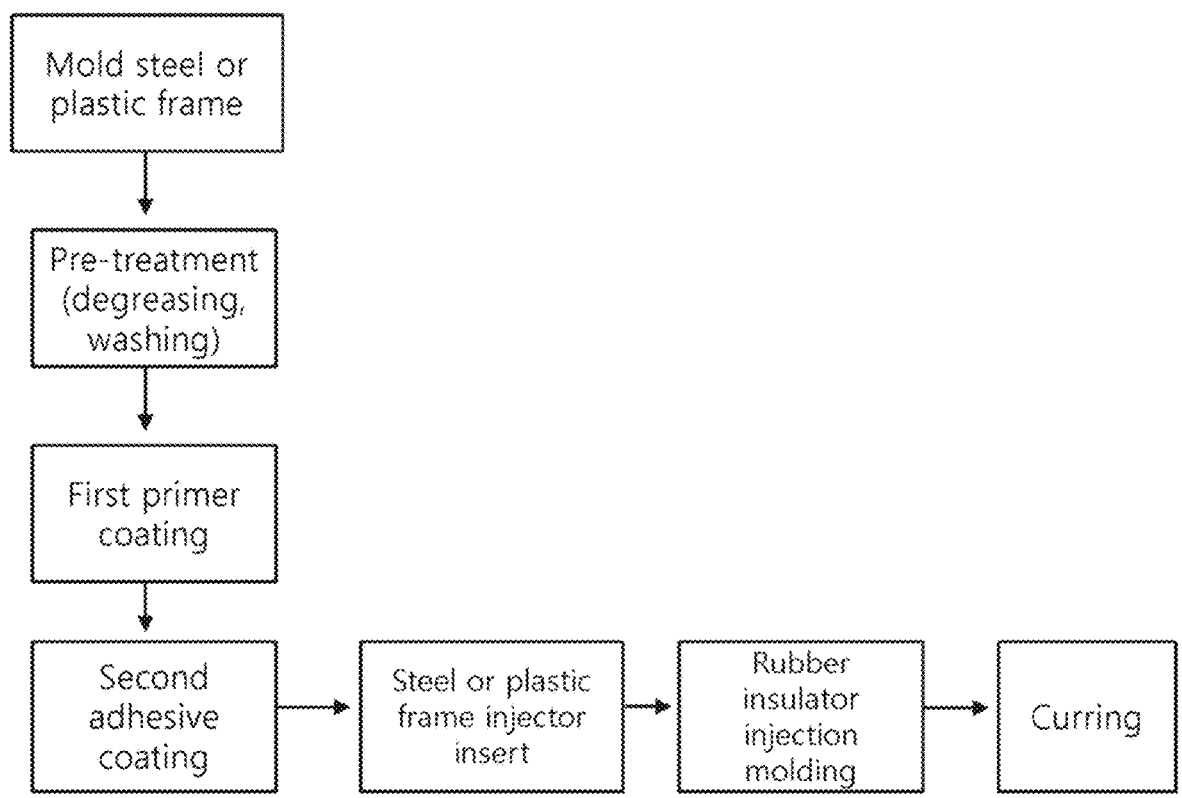
FIG. 1 is a block diagram showing an order of a conventional spring pad manufacturing process.

Hereinafter, preferred embodiments of the present invention will be described in detail with reference to the accompanying drawings. However, the embodiments are exemplary for describing the present disclosure more specifically, and it will be understood by those skilled in the art that the scope of the present disclosure is not limited by the embodiments.

In the drawings, thicknesses of lines and sizes of constituent elements may be exaggerated for clarity and convenience in explanation.

Further, wordings to be described later are defined in consideration of the functions of the present invention, and may differ depending on the intentions of a user or an operator or custom. Accordingly, such wordings should be defined on the basis of the contents of the overall specification.

In addition, the embodiment disclosed hereinafter does not limit the scope of the present invention, but corresponds to merely exemplary terms of constituent elements presented in claims of the present invention, and the embodiments that include replaceable constituent elements as equivalents of the constituent elements defined in the overall specification and claims may be included in the scope of the present invention.

Figure 2:
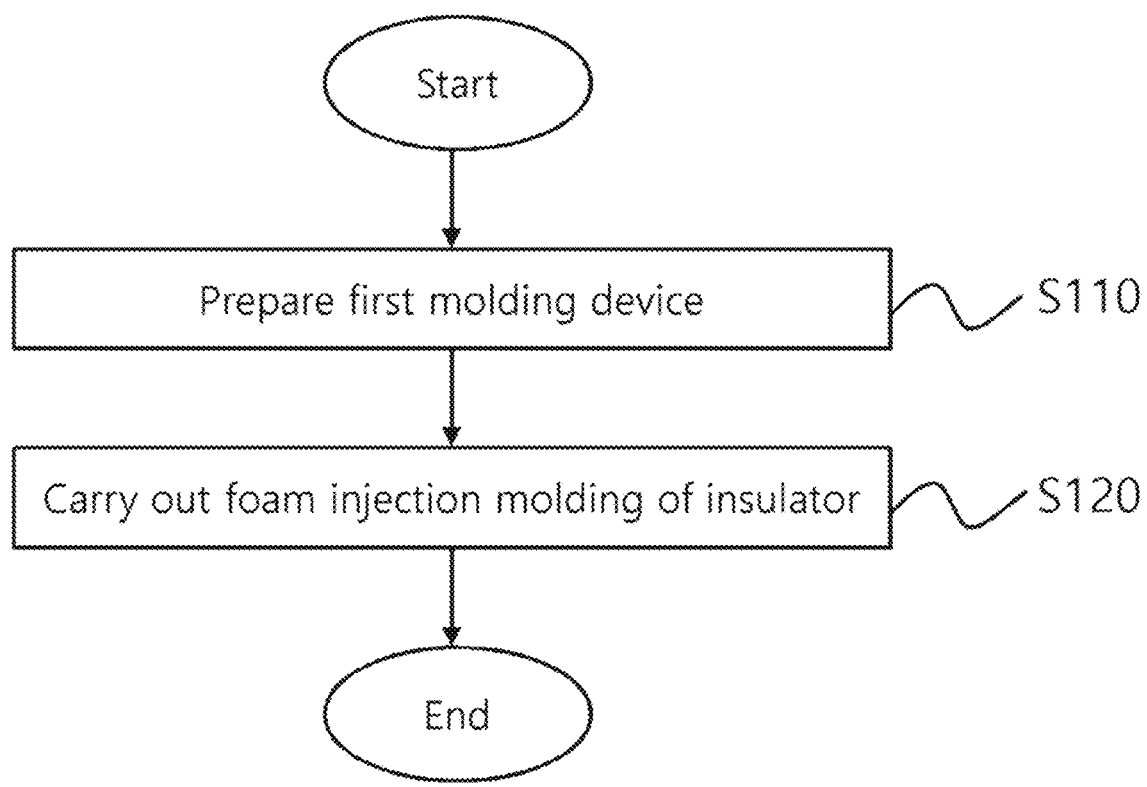
FIG. 2 is a schematic flow chart showing an order of a spring pad manufacturing process including an insulator according to a preferred embodiment of the present invention.
Figure 3:
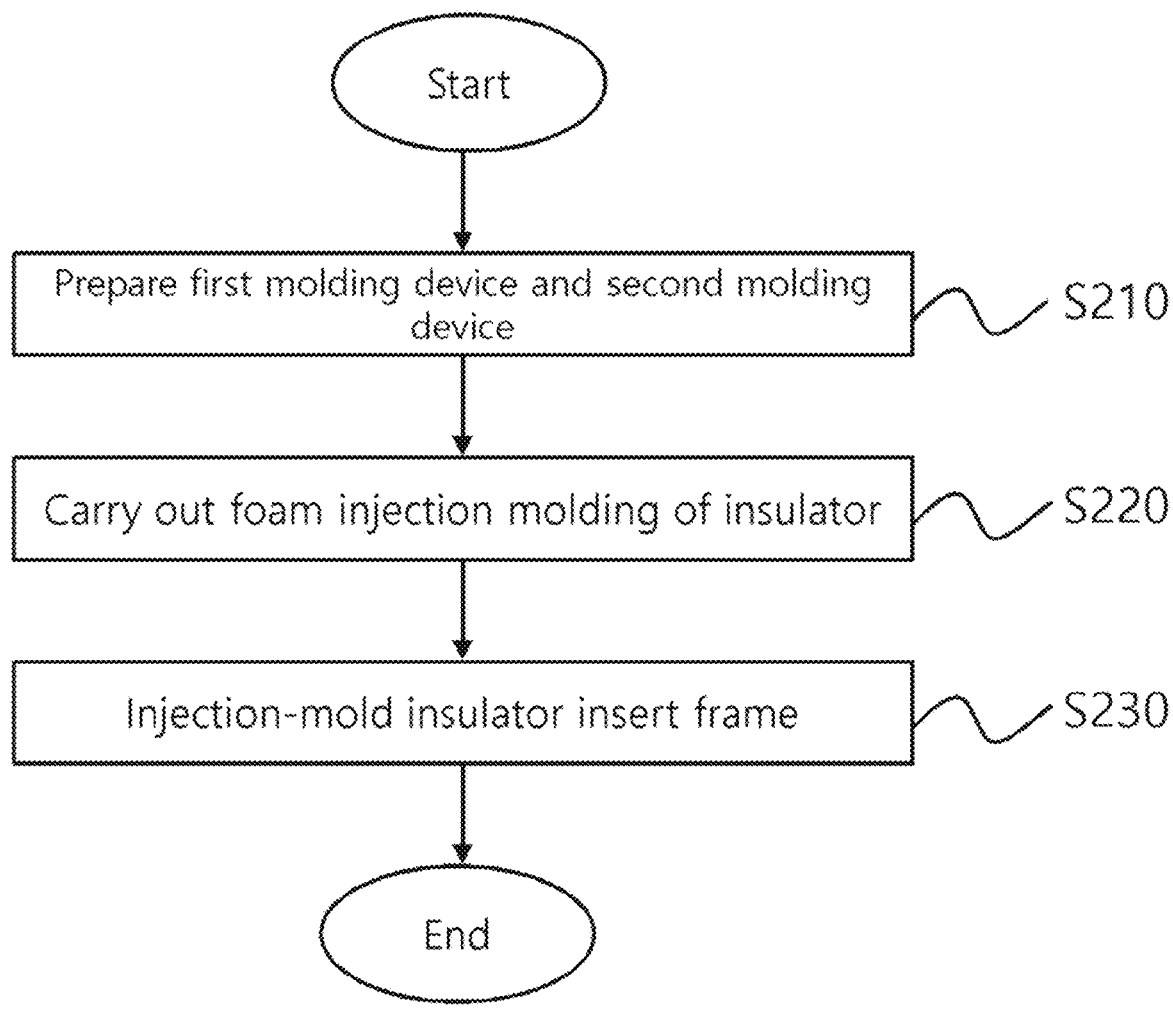
FIG. 3 is a schematic flow chart showing an order of a spring pad manufacturing process including an insulator and a frame according to a preferred embodiment of the present invention.
Figure 4:
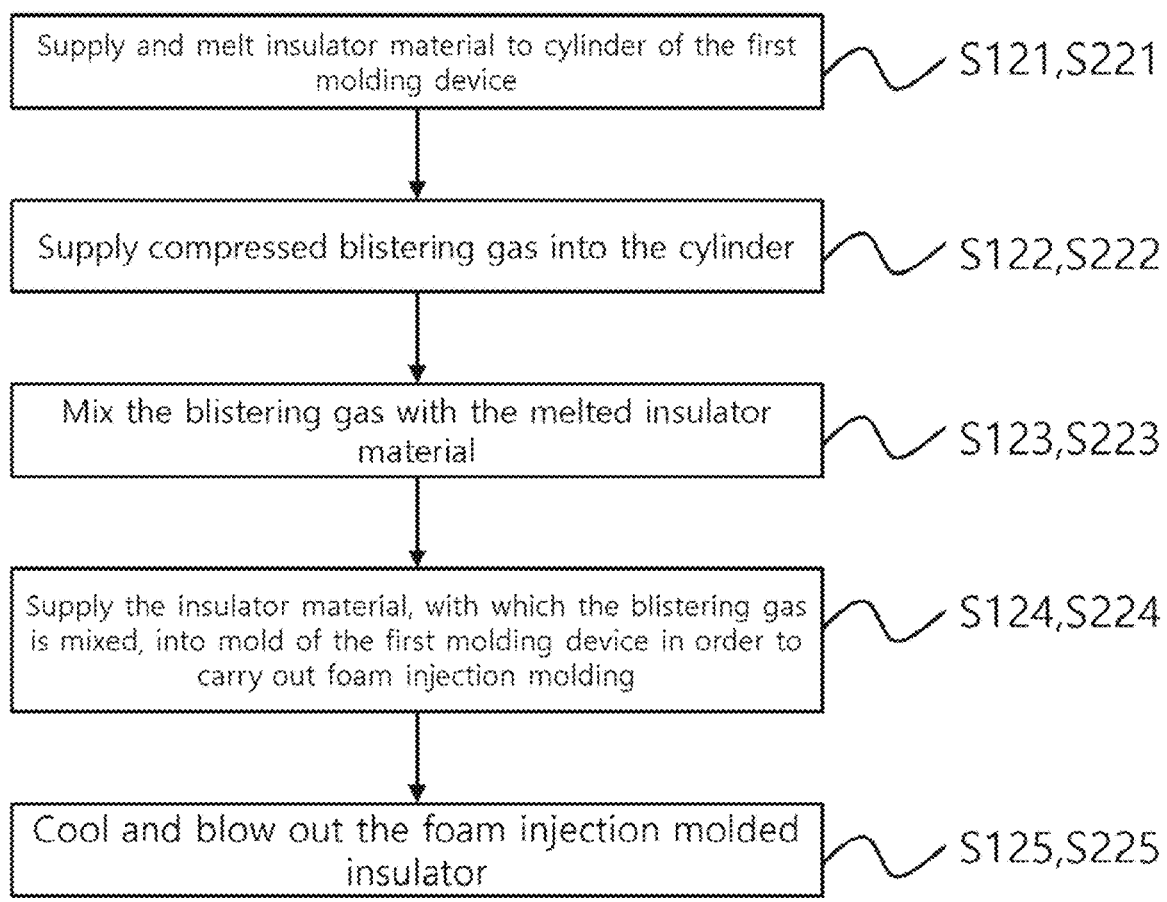
FIG. 4 is a flow chart showing an insulator foam injection molding method according to a preferred embodiment of the present invention.
Figure 5:
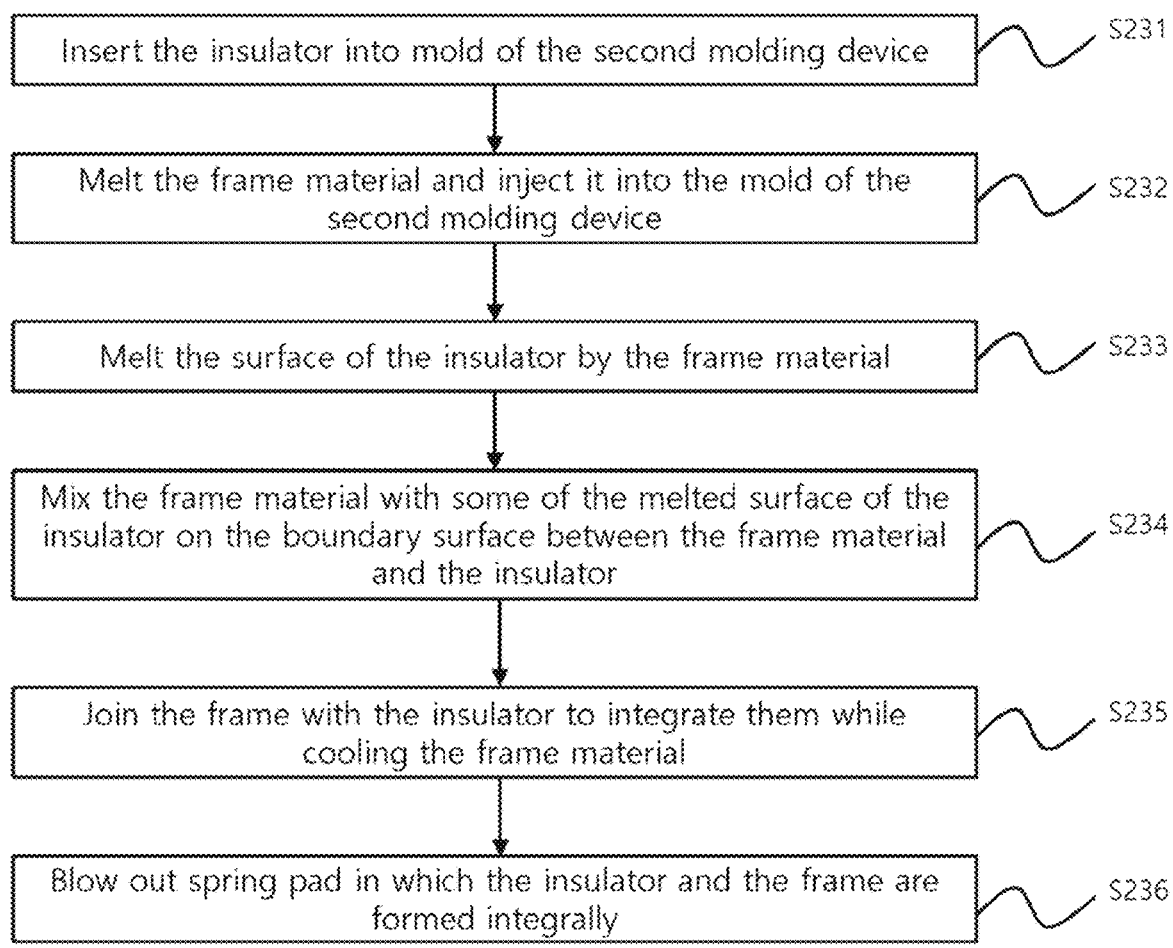
FIG. 5 is a flow chart showing an insulator insert frame injection molding method according to a preferred embodiment of the present invention.
Figure 6A:
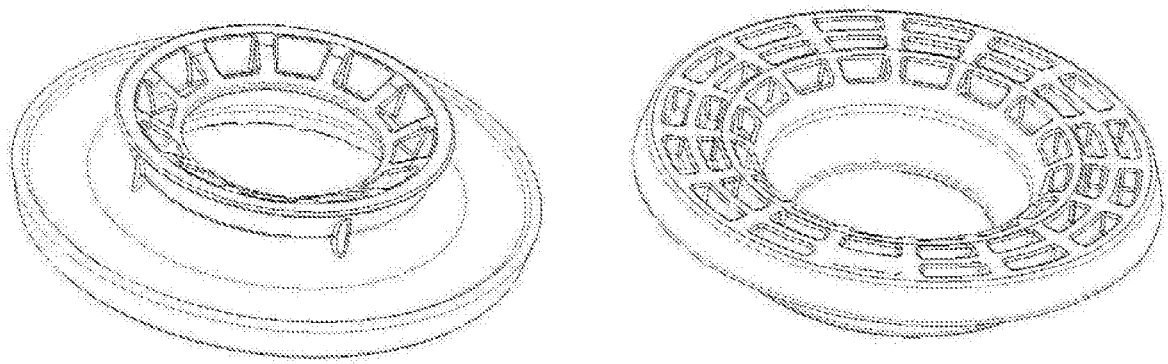
Figure 6B:
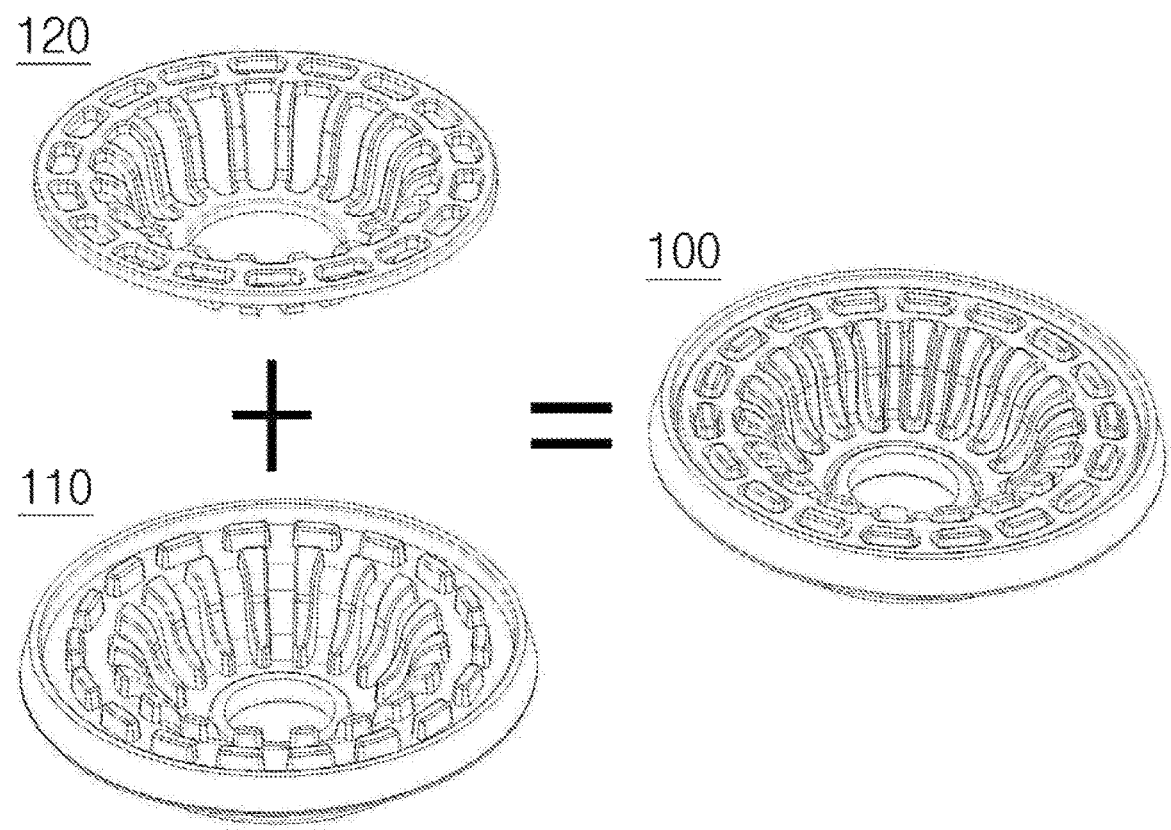
Figure 7:
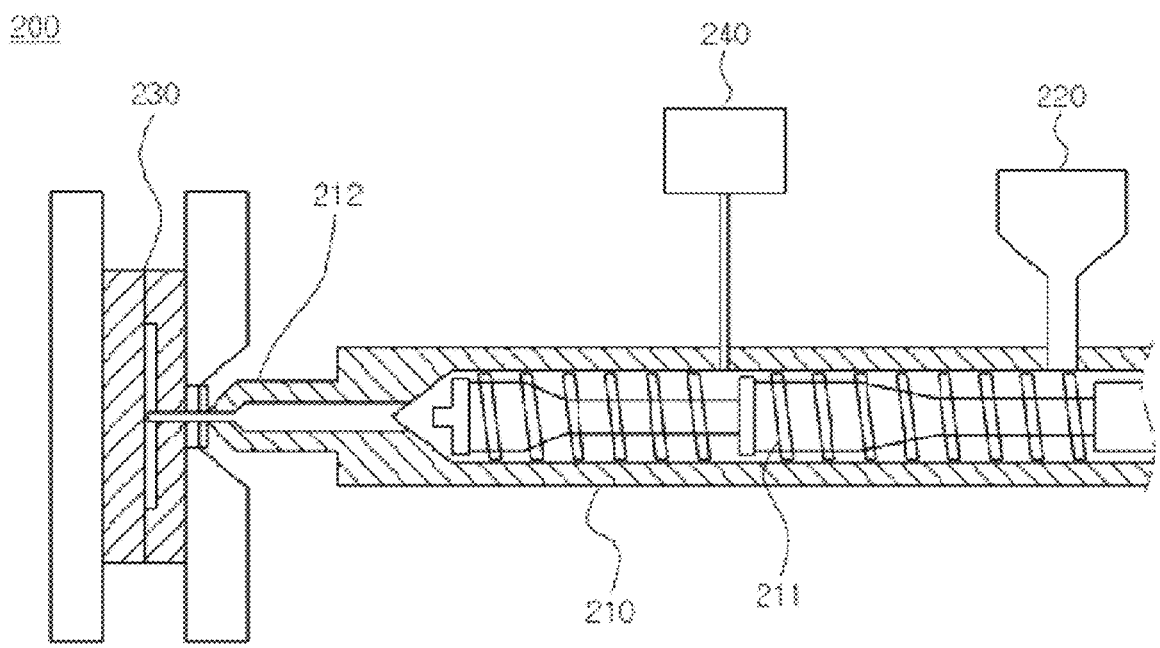
FIG. 7 is a schematic diagram of a first molding device according to a preferred embodiment of the present invention.

FIG. 2 is a schematic flow chart showing an order of a spring pad manufacturing process including an insulator according to a preferred embodiment of the present invention, FIG. 3 is a schematic flow chart showing an order of a spring pad manufacturing process including an insulator and a frame according to a preferred embodiment of the present invention, FIG. is a flow chart showing an insulator foam injection molding method according to a preferred embodiment of the present invention, FIG. 5 is a flow chart showing an insulator insert frame injection molding method according to a preferred embodiment of the present invention, FIGS. 6A and 6B are schematically perspective views of a spring pad according to a preferred embodiment of the present invention, wherein FIG. 6A is a photograph showing a spring pad made with a single material and FIG. 6B is a photograph showing a spring made with a composite material, and FIG. 7 is a schematic diagram of a first molding device according to a preferred embodiment of the present invention.

As shown in the drawings, the present invention provides a spring pad manufacturing method which can manufacture an insulator 110 using foam injection molding to make a spring pad 100 lightweight.

In the meantime, the spring pad 100 according to the present invention is interposed among a spring used in an automobile suspension system and an upper sheet and a lower sheet for supporting the spring.

Moreover, the spring pad 100 includes the insulator 110 getting in contact with the spring to absorb shock and forming a body of the spring pad. The spring pad manufacturing method is to manufacture the insulator through foam injection molding to make the spring pad lightweight.

In this instance, the manufacturing method of the spring pad 100 includes the steps of: (S110) preparing a first molding device 200 for injection-molding the insulator 110; and (S120) doing foam injection molding of the insulator 110 through the first molding device 200.

Furthermore, the spring pad 100 includes a frame 120 combined with the insulator 110 to enhance rigidity of the insulator 110.

In this instance, the manufacturing method of the spring pad 100 includes the steps of: (S210) preparing a first molding device 200 for injection-molding the insulator 110 and a second molding device for injection-molding the frame 120; (S220) doing foam injection molding of the insulator 110 through the first molding device 200; and (S230) inserting the foam injection molded insulator 110 into the second molding device to injection-mold the frame 120.

Here, as described above, the process of second molding the frame 120 by inserting the first molded insulator after first molding the insulator 110 is just an embodiment of the present invention, on the contrary, it is also possible that the frame 120 is first molded and the insulator 110 is second molded by inserting the first molded frame.

In the meantime, the first molding device 200 includes: a screw 211 rotatably arranged inside the cylinder 210; a hopper 220 mounted at an upper end of one side of the cylinder 210; a heater mounted on the cylinder 210 to supply heat into the cylinder 210; a mold 230 connected to a nozzle 212 of an end of the other side of the cylinder 210; and a gas supply device 240 for supplying blistering gas of high pressure into the cylinder 210.

Additionally, the insulator foam injection molding steps (S120 and S220) include the steps of: (S121, S221) supplying and melting a material of the insulator 110 to the cylinder 210 of the first molding device 200; (S122, S222) supplying compressed blistering gas into the cylinder 210; (S123, S223) mixing the blistering gas with the melted insulator material; (S124, S224) supplying the insulator material, with which the blistering gas is mixed, into the mold 230 of the first molding device; and (S125, S225) cooling and blowing out the foam injection molded insulator 110.

Moreover, the blistering gas supplying steps (S122 and S222) further include the step of depressurizing the blistering gas at a predetermined supply pressure through a decompression device.

In this instance, it is preferable that the supply pressure V(bar) of the blistering gas be set to satisfy the following [Mathematical formula 1].

$$N = V + (5\sim50) \text{ (bar), wherein } N \text{ is pressure (bar) of insulator material in the cylinder.} \quad \text{[Mathematical Formula 1]}$$

According to the mathematical formula 1, the pressure applied to the insulator in the cylinder must be larger than the supply pressure of the blistering gas. As a result of an experiment, it was confirmed that injection work was progressed smoothly when the pressure was set to be at about 5 to 50 bars.

In this instance, the pressure applied to the insulator material in the cylinder is equal to pressure applied to the screw 211 rotatably arranged in the cylinder 210 which applies pressure to the insulator.

Furthermore, the foam injection molding steps (S124 and S224) include the steps of: supplying the blistering gas mixed with the insulator material into the mold 230 in the cylinder 210 and dropping pressure; and forming foamed bubbles while dropping pressure to expand the blistering gas.

That is, when the insulator material is put in through the hopper 220, the insulator material is melted by the heater and the screw while being transferred by the screw 211. The blistering gas is put into the cylinder 210 by the gas supply device 240 and is mixed with the melted insulator material.

Additionally, the mixed and melted insulator material is charged into the mold 230 by rotation of the screw 211 so as to have the shape of the insulator 110.

In this instance, when the blistering gas mixed with the melted insulator material in the cylinder 210 starts to pass an end of the injector nozzle 212 and to be charged into the mold 230, pressure is changed from high pressure into atmospheric pressure.

By such a pressure difference, the blistering gas existing in the melted insulator material forms a bubble layer and foaming work is progressed.

In addition, it is preferable that a foaming rate of the insulator be from 10% to 40%.

Moreover, if the insulator 110 is foamed more than 40%, it is preferable to do foam injection molding using a core back method.

Furthermore, the blistering gas may contain nitrogen.

Additionally, the following [Table 1] is a table to compare the foamed insulator of the present invention with the conventional insulator made of rubber.

TABLE 1

| Method | Rubber molding (conventional) | | Foam molding | | | |
|---|---|---|---|---|---|---|
| Material | NR + SPCC | NR only | TPU | | TPC | |
| Specific gravity (g/cm) | 0.9 | 0.9 | 1.1 | 0.8 | 1.1 | 0.8 |
| Foaming rate (%) | 0 | 0 | 0 | 30 | 0 | 27 |
| Weight (g) | 192 | 136 | 109 | 76 | 102 | 74 |
| Molding time (sec) | 450 | 450 | 120 | 80 | 120 | 80 |

In the Table 1, NR is natural rubber.

As shown in the Table 1, the foam injection molded insulator 110 is more lightweight than the conventional insulator and can enhance productivity due to reduction of molding time.

Meanwhile, the insulator and the frame are made of thermoplastic resin.

Moreover, rigidity of the insulator material is lower than that of the frame material and a melting point of the insulator material is lower than that of the frame material. A spring pad in which the insulator and the frame are formed integrally is manufactured using a difference in melting point between the insulator material and the frame material.

In this instance, the insulator insert frame injection molding step (S230) includes the steps of: (S231) inserting the insulator 110 into a mold of the second molding device; (S232) melting the frame material and injecting the melted frame material into the mold of the second molding device; (S233) melting the surface of the insulator by the frame material; (S234) mixing some of the melted surface of the insulator with the frame material on the boundary surface between the frame material and the insulator; (S235) joining the insulator and the frame integrally while cooling the frame material; (S236) blowing out the spring pad in which the insulator and the frame are formed integrally.

In the meantime, the second molding device includes a cylinder, a screw rotatably arranged in the cylinder, a hopper mounted at an upper end of one side of the cylinder, a heater mounted on the cylinder to supply heat into the cylinder, and a mold connected to a nozzle part of an end of the other side of the cylinder. The frame material is melted by the screw and the heater and is injected into the mold.

The second molding device is generally widely used in plastic injection molding, so detailed description and illustration of the second molding device will be omitted.

The insulator material may be one selected from thermoplastic polyester elastomer (TPEE), thermoplastic poly urethane (TPU), thermoplastic vulcanizates (TPV), and TPC, or combination of two or more among them.

Furthermore, the frame material may be one selected from nylon, PA6, PA66, poly butylene terephthalate (PBT), poly propylene (PP), ABS and PC, or combination of two or more among them.

Additionally, combination of the insulator material and the frame material may be set as the following Case 1 or Case 2.

(Case 1): TPE+TPEE, TPE+PBT, PC, ABS or TPU
(Case 2): TPU+TPU, TPU+PA6, PA66, PC, ABS or TPE In addition, the frame material includes at least one among 10 to 60 parts by weight of glass fiber (GF) and 10 to 40 parts by weight of talc (crushed rock) based on 100 parts by weight of base chips made of PBT and PA6 or PA66.

As described above, the spring pad manufacturing method according to the present invention is environmentally friendly, enhances productivity due to reduction of molding time, and make the spring pad lightweight since substituting rubber and steel with the recyclable thermoplastic material.

Although exemplary embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A manufacturing method of a spring pad interposed among a spring used in an automobile suspension system and an upper sheet and a lower sheet for supporting the spring,
    wherein the spring pad includes an insulator getting in contact with the spring to absorb shock, and is manufactured through foam injection molding to be lightweight,
    wherein the spring pad includes a frame combined with the insulator to enhance rigidity of the insulator,
    wherein the spring pad manufacturing method comprises:
        (S210) preparing a first molding device for injection-molding the insulator and a second molding device for injection-molding the frame;
        (S220) doing foam injection molding of the insulator through the first molding device; and
        (S230) inserting the foam injection molded insulator into the second molding device in order to injection-mold the frame.

2. The spring pad manufacturing method according to claim 1,
    wherein the insulator foam injection molding steps (S120, S220) comprise the steps of:
    (S121, S221) supplying and melting a material of the insulator to a cylinder of the first molding device;
    (S122, S222) supplying compressed blistering gas into the cylinder;
    (S123, S223) mixing the blistering gas with the melted insulator material;
    (S124, S224) supplying the insulator material, with which the blistering gas is mixed, into the mold of the first molding device; and
    (S125, S225) cooling and blowing out the foam injection molded insulator.

3. The spring pad manufacturing method according to claim 2,
    wherein the blistering gas supplying steps (S122, S222) comprise the steps of:
    depressurizing the blistering gas at a predetermined supply pressure through a decompression device.

4. The spring pad manufacturing method according to claim 1,
    wherein the insulator and the frame are made of thermoplastic resin, and rigidity of the insulator material is lower than that of the frame material and a melting point of the insulator material is lower than that of the frame material,
    wherein the spring pad in which the insulator and the frame are formed integrally is manufactured using a difference in the melting point between the insulator material and the frame material.

* * * * *